United States Patent [19]

Inazawa

[11] Patent Number: 4,811,315

[45] Date of Patent: Mar. 7, 1989

[54] DISC PLAYER WITH PROGRAM SELECTION CONTROL

[75] Inventor: Yoshizumi Inazawa, Yokohama, Japan

[73] Assignee: Sony Corporation, Tokyo, Japan

[21] Appl. No.: 471,670

[22] Filed: Mar. 3, 1983

[30] Foreign Application Priority Data

Mar. 5, 1982 [JP] Japan .................................. 57-34764

[51] Int. Cl.$^4$ .............................................. G11B 21/12
[52] U.S. Cl. ......................................... 369/32; 369/41; 360/78.04
[58] Field of Search ....................... 369/32, 33, 41, 43, 369/44, 46; 360/77, 78

[56] References Cited

U.S. PATENT DOCUMENTS

| | | |
|---|---|---|
| 3,662,363 | 5/1972 | Chertok .................................. 369/41 |
| 4,321,635 | 3/1982 | Tsuyuguchi .......................... 360/72.2 |
| 4,398,278 | 8/1983 | Suzuki .................................... 369/41 |
| 4,413,292 | 11/1983 | Sugiyama et al. .................. 358/342 |

*Primary Examiner*—Steven L. Stephan
*Attorney, Agent, or Firm*—Lewis H. Eslinger

[57] ABSTRACT

A disc player for reproducing program information recorded on a disc in a plurality of partitions together with address data for each partition includes a program selection control for selecting one of the partitions, representing a particular program. A program selecting key causes a pick-up to be positioned at the address identifying the start of a selected partition the same as or reversed from a present partition. Multiple manipulations of the program selecting key cause the selection of a partition multiply reversed from the present partition. A second program selecting key causes the selection of a partition advanced from the present partition.

2 Claims, 2 Drawing Sheets

DISC PLAYER WITH PROGRAM SELECTION CONTROL

BACKGROUND OF THE INVENTION

This invention relates generally to apparatus for reproducing an information signal from a record disc on which program information containing a plurality of partitions is recorded together with address information, such as a digital audio disc, and more particularly, is directed to a disc player used with a record disc on which program information containing a plurality of partitions is recorded together with address information indicating addresses provided to the respective program information partitions, which can reproduce an information signal selectively from any desired one of the program information partitions recorded on the record disc.

In a digital audio disc system, a digital audio disc which is a rotatable disc-shaped record medium on which a digital audio signal is recorded as program information is loaded on a disc player so that a reproduced audio signal is obtained from the digital audio signal recorded on the digital audio disc. With such a system a reproduced audio signal of high quality can be obtained easily. The program information recorded on the digital audio disc is usually composed of a plurality of partitions and accompanied with address information indicating addresses provided to the respective program information partitions in sequence of a predetermined order on the digital audio disc, and in reproducing an audio signal from such program information by the disc player, it is possible to obtain a reproduced audio signal selectively from any one of program information partitions recorded on the digital audio disc with use of the address information.

OBJECTS AND SUMMARY OF THE INVENTION

It is an object of the present invention to provide an improved disc player which can reproduce an information signal in a novel reproducing mode selectively from a desired portion of program information recorded on a record disc on which address information is also recorded in relation to the program information.

Another object of the present invention is to provide a disc player for reproducing an information signal from a record disc on which program information containing a plurality of partitions is recorded together with address information indiciating addresses provided to the respective program information partitions, which can quickly and surely search any desired one of the program information partitions recorded on the record disc in both directions forwarding and reversing the address provided to each program information partition on the record disc with use of the address information and then reproduce an information signal from the searched program information partition immediately after the search thereof is finished.

According to an aspect of the present invention, a disc player used with a record disc on which program information containing a plurality of partitions is recorded together with address information indicating addresses provided to the respective program information partitions in sequence of a predetermined order thereon, such as a digital audio disc, and having a pick-up device for reading the program information and address information from the record disc, is provided with, for example, a pair of program selecting keys each formed into a lever, button or the like, one of which is used for searching a desired program information partition in the direction forwarding the address provided to each program information partition on the record disc and then reading out the searched program information partition, and the other of which is used for searching a desired program information partition in the direction reversing the address provided to each program information partition on the record disc and then reading out the searched program information partition. When one of the program selecting keys is manipulated, for example, pushed once or more repeatedly in a reproducing mode wherein reproduction of an information signal from the record disc is performed by the disc player, the disc player operates to place the pick-up device quickly at the beginning end of a specific program information partition having an address distant by the address number determined in response to the number of times of manipulation for the program selecting key in the direction forwarding or reversing the address provided to each program information partition from the address provided to the program information partition which is read by the pick-up device at the time when the program selecting key is manipulated, and then to start reading out the specific program information partition. In particular, when the program selecting key for searching a desired program information partition in the direction reversing the address provided to each program information partition on the record disc and reading out the searched program information partition is manipulated, a predetermined available period is set immediately after the program selecting key is once manipulated, and if the program selecting key is additionally manipulated within the predetermined available period after the previous manipulation, the pick-up device is placed at the beginning end of a program information partition having an address reversed by the address number corresponding to the number of times of additional manipulation for the program selecting key conducted in each predetermined available period from the address provided to the program information partition which is read by the pick-up device at the time when the program selecting key is firstly manipulated, so that the search for the desired program information partition in the direction reversing the address provided to each program information partition on the record disc can be surely achieved.

The above, and other objects, features and advantages of the present invention will become apparent from the following detailed description thereof taken in conjunction with the accompanying drawings.

DESCRIPTION OF THE PREFERRED EMBODIMENT

Figure 1:
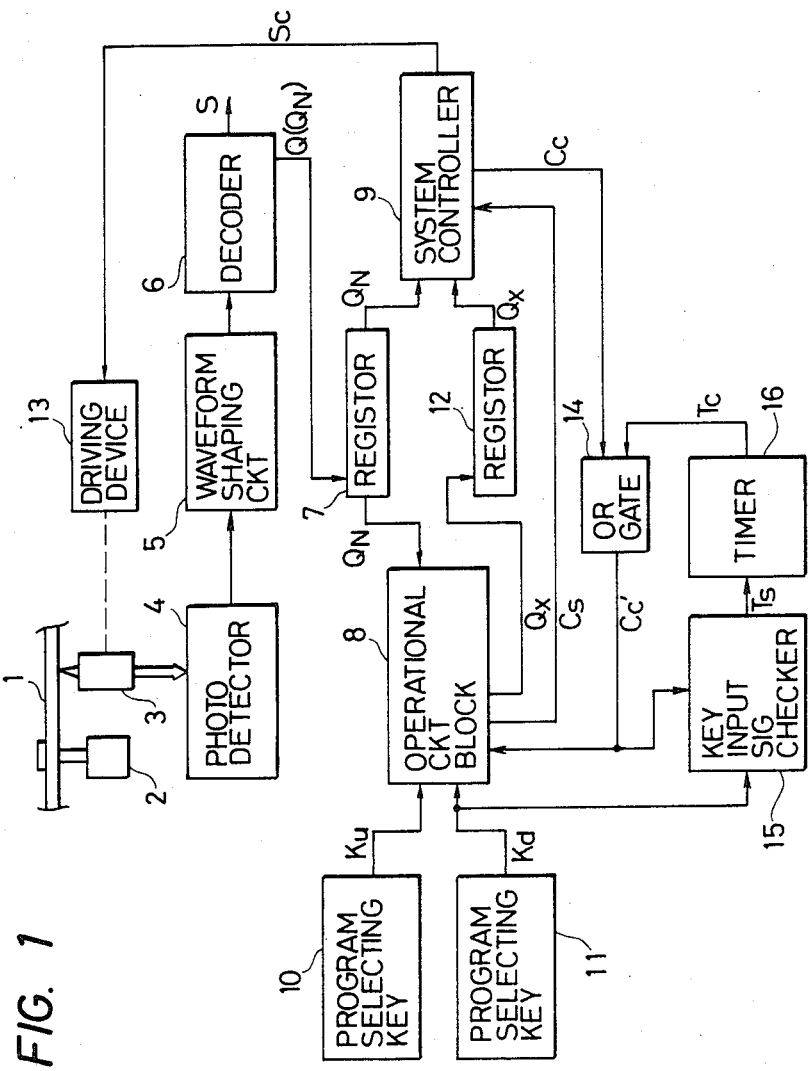
FIG. 1 is a block diagram showing an essential part of one embodiment of disc player according to the present invention.

FIG. 1 shows one example of a disc player according to the present invention. In this example, a disc 1 on which program information containing a plurality of partitions is recorded together with address data accompanying with the respective program information partitions, such as a digital audio disc on which an digital audio signal is recorded in the form of binary data together with binary address data, is provided. The disc 1 is loaded on the disc player according to the present invention and rotated at a predetermined rotational speed by a motor 2 provided for rotating a disc loaded on the disc player. The program information recorded on the disc 1 is read by a pick-up device. This example is an optical disc player and the pick-up device therein is formed into an optical head 3. The optical head 3 projects a laser light on the disc 1 and receives a reflected laser light from the disc 1, which is modulated in response to the program information recorded on the disc 1. The reflected laser light having passed through the optical head 3 is guided to a photo detector 4 and the photo-electrical conversion is performed in response to the reflected laser light at the photo detector 4 to produce a reproduced signal corresponding to the program information read by the optical head 3. The reproduced signal is shaped into an appropriate waveform so as to become a digital signal representing the program information accompanied with the address data at a waveform shaping circuit 5 and then supplied to a decoder 6. From the decoder 6, a program information signal S which is formed into binary data excluding the address data and reproduced address data Q in the form of binary data are obtained. The reproduced address data Q represent the address given to the program information partition which is read by the optical head 3 on that occasion. The program information signal S is fed to a circuit block (not shown FIG.) provided for processing the program information signal S so as to obtain an aimed reproduced audio signal, while the reproduced address data Q are supplied to a first register 7 and held therein. From the first register 7 the contents of the reproduced address data Q, that is, address data $Q_N$ corresponding to the address of the program information partition which is read by the optical head 3 on that occasion, are derived at an appropriate timing to be supplied to an operational circuit block 8 and to a system controller 9.

A first program selecting key 10 is provided for making the disc player take a forward program selection mode wherein the disc player is operative to select a program information partition having an address advanced from the address of the program information partition read by the optical head 3 on that occasion in order to reproduce an information signal therefrom, and a second program selecting key 11 is also provided for making the disc player take a reverse program selection mode wherein the disc player is operative to select the program information partition read by the optical head 3 on that occasion or a program information partition having an address reversed from the address of the program information partition read by the optical head 3 on that occasion in order to reproduce an information signal therefrom. Each of the first and second program selecting key 10 and 11 is formed into, for example, the push button type and placed at a control panel (not shown in FIGS.) provided on a cabinet of the disc player together with other control buttons.

When the first or second program selecting key 10 or 11 is manipulated, a key input signal $K_u$ or $K_d$ is generated in response to each manipulation for the first or second program selecting key 10 or 11 and supplied to the operational circuit block 8. The operational circuit block 8 performs the processing operation for the address data $Q_N$ derived from the first register 7 and the key input signal $K_u$ or $K_d$ so as to produce designated address data $Q_X$. The designated address data $Q_X$ are supplied to a second register 12 and held therein. From the second register 12 the designated address data $Q_X$ are derived at an appropriate timing to be used as an address designating signal. This means that the address designating signal is produced by the second register 12 and this address designating signal is supplied to the system controller 9. The system controller 9 is supplied with the address data $Q_N$ from the first register 7 and the address designating signal, that is, the designated address data $Q_X$ from the second register 12, and thereby produces a drive control signal $S_c$ and supplies it to a driving device 13 provided for driving the optical head 3 to move in the direction of the radius of the disc 1. The driving device 13 drives the optical head 3 in response to the drive control signal $S_c$ to move quickly in the direction to the peripheral portion from the central portion of the disc 1 or vice versa into the beginning end of a record area on the disc 1 where a program information partition provided with an address corresponding to the designated address data $Q_X$ is recorded, that is, an area of the designated address. During such a movement of the optical head 3, the address data accompanying with the respective program information partitions on the disc 1 are read in turn by the optical head 3 so that the reproduced address data Q are obtained until the optical head 3 reaches the beginning end of the area of the designated address, and the address date $Q_N$ corresponding to the address data read out from the disc 1 is supplied to the system controller 9. Accordingly, the drive control signal $S_c$ is varied in response to the variations in the address data $Q_N$ and, as a result of this, the area of the designated address where the optical head 3 is to reach is detected.

In such a program selecting operation, whenever either the first program selecting key 10 or the second program selecting key 11 is manipulated once, a command signal $C_s$ for starting program selection is supplied to the system controller 9 from the operational circuit block 8, and during a period when the optical head 3 is moving to the area of the designated address on the disc 1 in process of program selection, a control signal $C_c$ is supplied to one of the input terminals of a two-input OR gate 14 from the system controller 9 and an output signal $C_c'$ of the OR gate 14 obtained at that time is supplied to the operational circuit block 8 as a signal indicating that the program selection is in progress, so that it is descerned in the operational circuit block 8 whether the program selection is in progress or not. Further, the key input signal $K_d$ which is generated when the second program selecting key 11 is manipulated is also supplied to a key input signal checker 15 and thereby the key input signal checker 15 discriminates the first manipulation for the second program selecting key 11 from additional manipulation for the second program selecting key 11 following to the first manipulation. When the first manipulation for the second program selecting key 11 is detected at the key input signal checker 15, a starting signal $T_s$ is generated by the key input signal checker 15 and supplied to a timer 16 so as to make the latter start operating. A control signal $T_c$ obtained from the timer 16 is supplied to the other of the input terminals of the OR gate 14 and the output $C_c'$ of the OR gate obtained at that time is supplied to the operational circuit block 8 as a signal for continuing the program selecting operation, so that the reverse selection mode is surely taken.

Now, the program selecting operation of the embodiment shown in FIG. 1 will be described more in detail hereinafter.

It is assumed that the first program selecting key 10 is manipulated once when a program information partition provided with an address N is read out from the disc 1 by the optical head 3. The key input signal $K_u$ generated in response to this manipulation for the first program selecting key 10 is supplied to the operational circuit block 8. At this time, the address data $Q_N$ supplied to the operational circuit block 8 from the first register 7 represent the address N and the operational circuit block 8 performs the processing operation for this address data $Q_N$ and the key input signal $K_u$ so as to produce the designated address data $Q_X$ representing an address N+1, that is, an address next to the address N to be supplied to the second register 12. Such designated address data $Q_X$ are supplied to the system controller 9 from the second register 12 as an address designating signal which designates the address N+1. The system controller 9 produces the drive control signal $S_c$ in response to the address designating signal, thereby to control the driving device 13 so as to move the optical head 3 into the beginning end of a record area on the disc 1 where a program information partition provided with the address N+1 is recorded. Then, the optical head 3 starts reading the program information partition provided with the address N+1. In such a manner, the program information partition provided with the address N+1 is selected for reproducing an information signal therefrom.

If the first program selecting key 10 is manipulated again when the program selecting operation for selecting the program information partition provided with the address N+1 is in progress, the operational circuit block 8 performs the processing operation for the address data $Q_N$ representing the address N+1 and the key input signal $K_u$ so as to produce the designated address data $Q_X$ representing a new address N+2 to be supplied to the second register 12. The designated address data $Q_X$ representing the address N+2 are supplied to the system controller 9 from the second register 12 as an address designating signal which designates the address N+2. The system controller 9 produces the drive control signal $S_c$ in response to the address designating signal, thereby to control the driving device 13 so as to move the optical head 3 into the beginning end of a next record area where a program information partition provided with the address N+2 is recorded. Thus, the program information partition provided with the address N+2 is selected for obtaining a reproduced information signal therefrom.

After that, in the same manner as mentioned above, the designated address data $Q_X$ supplied to the second register 12 are varied whenever the first program selecting key 10 is manipulated and the drive control signal $S_c$ produced in response to such designated address data $Q_X$ is obtained. If the first program selecting key 10 is manipulated X times repeatedly, the designated address data $Q_X$ representing an address N+X are supplied to the system controller 9 from the second register 12 as an address designating signal and the drive control signal $S_c$ produced in response to the designated address data $Q_X$ representing the address N+X is obtained to be supplied to the driving device 13. As a result of this, the optical head 3 is moved into the beginning end of a record area on the disc 1 where a program information partition provided with the address N+X is recorded and then reads out the program information partition from that record area.

In the meanwhile, if the second program selecting key 11 is manipulated when the program information partition provided with the address N is read by the optical head 3, with the purpose of obtaining an information signal reproduced from the program information partition provided with the address N from the beginning thereof or obtaining an information signal reproduced from another program information partition provided with an address reversed from the address N, the key input signal $K_d$ generated in response to the manipulation for the second program selecting key 11 is supplied to the operational circuit block 8.

In this case, with the first manipulation for the second program selecting key 11, the designated address data $Q_X$ representing the address N is supplied to the second register 12 from the operational circuit block 8 and then further supplied to the system controller 9 from the second register 12 as an address designating signal. The system controller 9 produces the drive control signal $S_c$ in response to the designated address data $Q_N$ representing the address N and controls the driving device 13 with the produced drive control signal $S_c$ so as to move the optical head 3 into the beginning end of the record area where the program information partition provided with the address N is recorded.

Figures 2A, 2B, 2C, 2D:
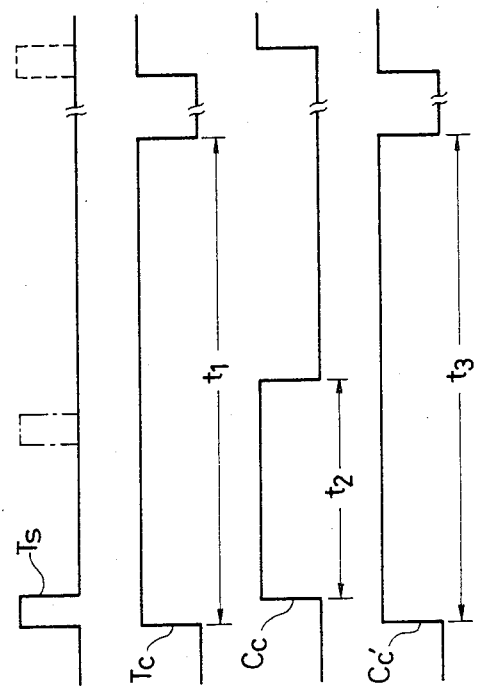
FIGS. 2A to 2D are waveform diagrams used for explaining the operation of the embodiment shown in FIG. 1.

At the same time as the above mentioned operation, the key input signal checker 15 detects the first manipulation for the second program selecting key 11 and produces the starting signal $T_s$, as shown in FIG. 2A. With the rising edge of the starting signal $T_s$ the timer 16 starts to operate and generates the control signal $T_c$, as shown in FIG. 2B, so as to be supplied to the OR gate 14. The timer 16 is so arranged that the duration $t_1$ of the control signal $T_c$ becomes longer than time necessitated by a person for manipulating the second program selecting key 11 twice repeatedly. (The time duration $t_1$ is set to be, for example, 1.5 to 2.0 seconds.) Further, the control signal $C_c$ supplied to the OR gate 14 from the system controller 9 is so formed as to have its duration $t_2$ beginning at the time point when the drive control signal $S_c$ is first derived from the system controller 9 to which the designated address data $Q_X$ are supplied from the operational circuit block 8 after the second program selecting key 11 is manipulated (this time point is slightly delayed compared with the rising edge of the starting signal $T_s$) and terminating at the time point when the movement of the optical head 3 into the beginning end of the area of the designated address under the control by the drive control $S_c$ is completed, as shown in FIG. 2C. From the OR gate 14 to which the control signal $C_c$ from the system controller 9 and the control signal $T_c$ from the timer 16 are supplied, the output signal $C_c'$ as shown in FIG. 2D is obtained with the logical sum of the control signals $C_c$ and $T_c$ performed therein and supplied to both of the operational circuit block 8 and the key input signal checker 15.

If the second program selecting key 11 is manipulated again within the duration $t_3$ of the output signal $C_c'$ of the OR gate 14, the second starting signal $T_s$ is generated by the key input signal checker 15 within the duration $t_3$ of the output signal $C_c'$, as shown by a dot-dash line in FIG. 2A, and supplied to the timer 16 so that the control signal $T_c$ from the timer 16 is reformed to have another duration $t_1$ beginning at the rising edge of the second starting signal $T_s$, and with the key input signal $K_d$ supplied to the operational circuit block 8 at that time, the designated address data $Q_X$ supplied to the second register 12 are varied to represent an address $N-1$ which is reversed by the address from the address N. This new designated address data $Q_X$ so varied as to representing the address $N-1$ are supplied to the system controller 9 from the second register 12 as an address designating signal. The system controller 9 is supplied with the address data $Q_N$ representing the address of the program information partition read by the optical head 3 on that occasion from the first register 7 in addition to the designated address data $Q_X$ and produces the drive control signal $S_c$ for moving the optical head 3 so that the address data $Q_N$ is varied to be coincident with the new designated address data $Q_X$. With this drive control signal $S_c$ the driving device 13 moves the optical head 3 into the beginning end of a record area on the disc 1 where a program information partition provided with the address $N-1$ is recorded.

If the second program selecting key 11 is manipulated again after the duration $t_3$ of the output signal $C_c'$ of the OR gate 14, the second starting signal $T_s$ is generated after the duration $t_3$ of the output signal $T_s$, as shown by a bloken line in FIG. 2A. In such a case, the situation is the same as the above mentioned first situation wherein the second program selecting key 11 is manipulated once first and therefore the optical head 3 is so controlled to move into the beginning end of the record area where the program information partition provided with the address N is recorded.

Summarizing the above described operation in the reverse program selection mode, when the second program selecting key 11 is manipulated once, the designated address data $Q_X$ representing the address N, which is provided to the program information partition read by the optical head 3 on that occasion, are obtained and if the second program selecting key 11 is manipulated again within a predetermined available period, putting it concretely, the duration $t_3$ of the output signal $C_c'$ of the OR gate 14, the designated address data $Q_X$ representing the address $N-1$, which is reversed by one address from the address N, are obtained. After that, in the same manner, the designated address data $Q_X$ representing an address reversed one by one are obtained whenever the second program selecting key 11 is manipulated within the predetermined available period. The designated address data $Q_X$ thus obtained are supplied to the system controller 9 from the second register 12 as an address designating signal and, as a result of this, the optical head 3 is moved into the beginning end of the record area on the disc 1 where the program information partition provided with the address N or any other address reversed from the address N and then starts reading the program information partition therefrom.

Although the above described embodiment of the present invention is formed into an optical disc player used with a disc on which program information is recorded in the form of digital data, it is understood that the invention is not limited to such an embodiment, and that a disc player according to the present invention can be formed into an optical disc player of a different type or one of various kinds of disc players other than optical disc player without departing from the scope or spirit of the invention defined in the appended claims.

What is claimed is:

1. A disc player for reproducing an information signal from a disc on which program information containing a plurality of partitions is recorded together with address data indicating addresses of respective program information partitions, comprising:

pick-up means for reading the program information and address data recorded on the disc;

address data reproducing means for obtaining, from the output of said pick-up means, reproduced address data representing a first address corresponding to a program information partition then being read by said pick-up means;

program selecting key means for selecting one of the program information partitions on said disc for obtaining a reproduced information signal therefrom, said program selecting key means generating a key input signal in response to each manipulation thereof;

operational processing means, supplied with said key input signal, for producing designated address data representing said first address when said program selecting key means is manipulated once, and for producing designated address data representing a second address reversed from said first address in response to each further manipulation of said program selecting key means which occurs within a predetermined available period after the immediately previous manipulation of said program selecting key means;

system control means for producing a control signal in response to said reproduced address data and said designated address data;

driving means for driving said pick-up means in response to said control signal so as to move said pick-up means to a beginning end of a selected program information partition which is provided with the address represented by said designated address data;

timer means for generating an output signal for said predetermined available period in response to said key input signal; and means for controlling said operational processing means in response to said output signal from said timer means, wherein said output signal is initiated upon said manipulation of said program selecting key means;

said output signal continues at least until said pick-up means has been moved to the beginning end of the program information partition which is provided with the address represented by said first address; and if said program selecting key means is further manipulated during said output signal, said output signal is continued after the further manipulation for a time equal to said predetermined available period.

2. A disc player according to claim 1, wherein said predetermined available period is long enough to permit therein at least two manipulations of said program selecting key means.

* * * * *